(12) United States Patent
Yamada et al.

(10) Patent No.: US 10,027,226 B2
(45) Date of Patent: Jul. 17, 2018

(54) CIRCUIT DEVICE, SWITCHING REGULATOR, AND ELECTRONIC APPARATUS

(71) Applicant: SEIKO EPSON CORPORATION, Tokyo (JP)

(72) Inventors: Atsushi Yamada, Nagoya (JP); Isamu Moriya, Chino (JP); Isao Shishikura, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/458,351

(22) Filed: Mar. 14, 2017

(65) Prior Publication Data

US 2017/0288538 A1 Oct. 5, 2017

(30) Foreign Application Priority Data

Mar. 30, 2016 (JP) ................. 2016-067505

(51) Int. Cl.
*H02M 3/156* (2006.01)
*H02M 1/32* (2007.01)

(52) U.S. Cl.
CPC ............ *H02M 3/156* (2013.01); *H02M 1/32* (2013.01)

(58) Field of Classification Search
CPC ................. H02M 3/156; H02M 1/32
See application file for complete search history.

(56) References Cited

U.S. PATENT DOCUMENTS

2005/0184714 A1* 8/2005 Rusu ............... H02M 1/38
323/282
2016/0072386 A1* 3/2016 Saito ............... H02M 3/158
323/271

FOREIGN PATENT DOCUMENTS

JP 2011-083104 A 4/2011

* cited by examiner

*Primary Examiner* — Emily P Pham
(74) *Attorney, Agent, or Firm* — Oliff PLC

(57) ABSTRACT

A circuit device includes: a comparator that outputs an output signal that is activated when a potential of an input terminal is lower than a determination level; a switch circuit that is electrically connected between an output node connected to a switching element that enters a conduction state or a non-conduction state according to a drive signal and the input terminal of the comparator, and is in a non-conduction state when the switching element is in a conduction state; and a control circuit that controls a level of the drive signal such that the switching element will not enter a conduction state again based on a period during which or the number of times the output signal of the comparator is activated after the switching element has transitioned from a conduction state to a non-conduction state.

11 Claims, 4 Drawing Sheets

CIRCUIT DEVICE, SWITCHING REGULATOR, AND ELECTRONIC APPARATUS

BACKGROUND

1. Technical Field

The present invention relates to a switching regulator that converts a DC voltage to a DC voltage having a different value, and a circuit device that constitutes at least a portion of the switching regulator. Furthermore, the invention relates to an electronic apparatus and the like that uses such a switching regulator.

2. Related Art

In a switching regulator that steps down a DC voltage, a drive current is supplied to an inductor by controlling on and off of a switching element in an output circuit. In the case where the switching element in the output circuit is incorporated in a semiconductor integrated circuit device (IC), one end of the inductor, which is an external component, is connected to an output terminal of the IC, and a capacitor is connected between another end of the inductor and a power supply terminal on a low potential side.

Also, a cathode and an anode of a Schottky barrier diode (SBD), for example, which is an external component, are respectively connected to the output terminal of the IC and the power supply terminal on the low potential side. Furthermore, an IC such as an SOC (System on Chip), for example, that acts as a load circuit that receives a power supply from the switching regulator is connected to the output terminal of the IC via the inductor.

In such a switching regulator, magnetic energy is accumulated in the inductor by a current that flows when the switching element in the output circuit is in an on state. When the switching element in the output circuit enters an off state, a current flows from the SBD to the load circuit via the inductor, the current being generated by the magnetic energy accumulated in the inductor.

However, in the case where a connection failure in connecting the SBD (open state or incomplete connection) has occurred in a step in which the SBD is mounted on a wiring board or the like, a large negative voltage, which is caused by a current that flows through the inductor and the load circuit connected in series to the same output terminal, is applied to the output terminal. As a result, it is possible that the switching element in the output circuit will break down.

When a product including the switching regulator is manufactured, breakdown of an IC due to a connection failure in connecting the SBD is a big problem. Even if an inspection after mounting is performed so that a product in which a connection failure has occurred is not shipped, if the IC breaks down during the inspection, the failure cannot be repaired simply by re-performing mounting of the SBD, and the IC needs to be replaced, resulting in an increase in cost. Also, in the case where a connection failure becomes apparent after a product that passed the shipping inspection has been shipped to where it is to be sold, further steps and costs are required to have the product repaired.

Heretofore, in order to avoid this situation, a diode or the like, which serves as a protection circuit, is connected, inside the IC, between an output terminal and a power supply terminal on the low potential side in order to absorb an over current, and thus the breakdown of the switching element in the output circuit is prevented. However, the voltage drop at the output terminal in a period when the switching element in the output circuit is in an off state is larger in the case where a current flows in the protection circuit than in the case where a current flows in the SBD, and therefore, if this state continues over a long period, it is possible that the switching element in the output circuit or the diode or the like in the protection circuit will break down or degrade.

As a related technology, in JP-A-2011-83104 (Abstract, FIGS. 1A and 1B), a switching regulator is disclosed that has a breakdown prevention function such that the switching regulator does not degrade or break down when the Schottky barrier diode serving as a flywheel diode enters an open state for whatever reason.

In FIGS. 1A and 1B in JP-A-2011-83104, when a flywheel diode Ds connected to an output terminal 120 of an integrated circuit unit 100a enters an open state, a detection transistor Tc turns on so as to cause a noise mask circuit 150 to operate. When the noise mask circuit 150 operates, the supply of a PWM drive signal S1 from a PWM circuit 160 to a switching transistor Tsw via a logic circuit 170 and a level shift circuit 180 is stopped.

According to JP-A-2011-83104 (Abstract, FIGS. 1A and 1B), when the potential of the output terminal 120 decreases below ground potential by a threshold voltage or more, a current flows through the detection transistor Tc, and thus the open state of the flywheel diode Ds is detected. However, the threshold voltage of the detection transistor Tc is approximately 0.7 V, which is larger than a forward voltage of 0.2 V to 0.3 V, of the flywheel diode Ds, and therefore, when the potential of the output terminal 120 decreases within a range less than 0.7 V below the ground potential, the connection failure of the flywheel diode Ds cannot be detected.

SUMMARY

A first advantage of some aspects of the invention is to provide a circuit device in which a connection failure in connecting a Schottky barrier diode between an output node and a power supply node on a low potential side is detected at a desired determination level, and when a connection failure in connecting the Schottky barrier diode occurs, a switching operation can be stopped. Also, a second advantage of some aspects of the invention is to provide a switching regulator using such a circuit device. Furthermore, a third advantage of some aspects of the invention is to provide an electronic apparatus using such a switching regulator.

A circuit device according to a first aspect of the invention includes: a comparator that includes an input terminal and an output terminal, and outputs an output signal that is activated when a potential of the input terminal is lower than a determination level from the output terminal; a switch circuit that is electrically connected between an output node connected to a switching element that enters a conduction state or a non-conduction state according to a drive signal and the input terminal of the comparator, and is in a non-conduction state when the switching element is in a conduction state; and a control circuit that controls a level of the drive signal such that the switching element will not enter a conduction state again based on a period during which or the number of times the output signal of the comparator is activated after the switching element has transitioned from a conduction state to a non-conduction state.

According to the first aspect of the invention, the comparator that activates the output signal when the potential of the output node is lower than the determination level and the control circuit that performs control such that the switching element will not enter a conduction state again based on the output signal of the comparator are provided, and therefore, a connection failure in connecting a Schottky barrier diode between the output node and a power supply node on a low potential side can be detected at a desired determination level, and a switching operation can be stopped when a connection failure in connecting the Schottky barrier diode occurs. As a result, the breakdown or degradation of the switching element in an output circuit or a circuit element of a protection circuit can be prevented. Also, by using the switch circuit, the potential of the output node is not applied to the input terminal of the comparator in a period in which the switching element supplies a power supply potential on a high potential side to the output node, and thus the breakdown of the comparator can be prevented.

Here, the switch circuit desirably includes a high voltage transistor. The power supply potential on the high potential side is applied to the switch circuit when the switching element is in a conduction state, and therefore, as a result of using the high voltage transistor, the switch circuit is unlikely to break down.

Also, the circuit device may further include a clamp circuit that has one end connected to the input terminal of the comparator and another end connected to a power supply node on a low potential side, and clamps the potential of the input terminal of the comparator when the potential of the input terminal of the comparator becomes higher than the power supply potential on the low potential side by a predetermined value or more.

Accordingly, an over voltage is prevented from being applied to the comparator due to the influence of a parasitic capacitance component of the switch circuit or the influence of a timing shift between the timing at which the switching element transitions to a conduction state or a non-conduction state and the timing at which the switch circuit transitions to a non-conduction state or a conduction state, and thus breakdown of the comparator can be prevented.

Also, the circuit device may include a protection circuit that has one end connected to the output node and another end connected to a power supply node on a low potential side, includes a transistor, and enters a conduction state when a potential of the output node becomes lower than a power supply potential on the low potential side by a forward voltage of a parasitic diode of the transistor or more. Accordingly, even in a case where a connection failure in connecting the Schottky barrier diode has occurred, the potential of the output node does not decrease below a fixed value, and thus breakdown of the switching element can be prevented.

In such a case, the transistor of the protection circuit desirably includes a high voltage transistor. The power supply potential on the high potential side is applied to the protection circuit when the switching element is in a conduction state, and therefore, as a result of using the high voltage transistor, the protection circuit is unlikely to break down.

In the case where the protection circuit is provided, the comparator may further include a second input terminal to which the power supply potential on the low potential side is applied, an offset voltage that is smaller than the forward voltage of the parasitic diode of the transistor of the protection circuit being set between the input terminal and the second input terminal, and may compare the potential of the output node with a determination level that is lower than the power supply potential on the low potential side by the offset voltage. Accordingly, a desired determination level can be set utilizing the offset voltage of the comparator.

In the circuit device described above, the control circuit may control the level of the drive signal such that the switching element will not enter a conduction state again in the case where the number of times the output signal of the comparator is continuously activated during a second period or more after a first period has elapsed from when the switching element transitioned from a conduction state to a non-conduction state, reaches a predetermined number of times, which is two times or more. Accordingly, the influence of noise or the like is removed, and thus whether or not a connection failure in connecting the Schottky barrier diode has occurred can be appropriately determined.

Also, the circuit device may further include the switching element that is connected between a power supply node on a high potential side and the output node, and, upon entering a conduction state according to the drive signal, supplies a power supply potential on the high potential side to the output node. In the case where the switching element is incorporated in a circuit device such as an IC, the size of the switching regulator can be decreased.

A switching regulator according to a second aspect of the invention includes any of the aforementioned circuit devices; a Schottky barrier diode that has a cathode connected to the output node and an anode connected to a power supply node on a low potential side; an inductor that has one end connected to the output node, and is supplied with a drive current from the switching element; and a capacitor that is connected between another end of the inductor and the power supply node on the low potential side, and accumulates a charge supplied from the inductor. According to the second aspect of the invention, a switching regulator can be provided in which the breakdown or degradation thereof is unlikely to occur even if a mounting failure in mounting the Schottky barrier diode occurs, using the circuit device that stops the switching operation when a connection failure in connecting the Schottky barrier diode has occurred.

An electronic apparatus according to a third aspect of the invention includes the switching regulator according to the second aspect of the invention. According to the third aspect of the invention, a highly reliable electronic apparatus can be provided using the switching regulator that is unlikely to break down or degrade even if a mounting failure in mounting the Schottky barrier diode occurs.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
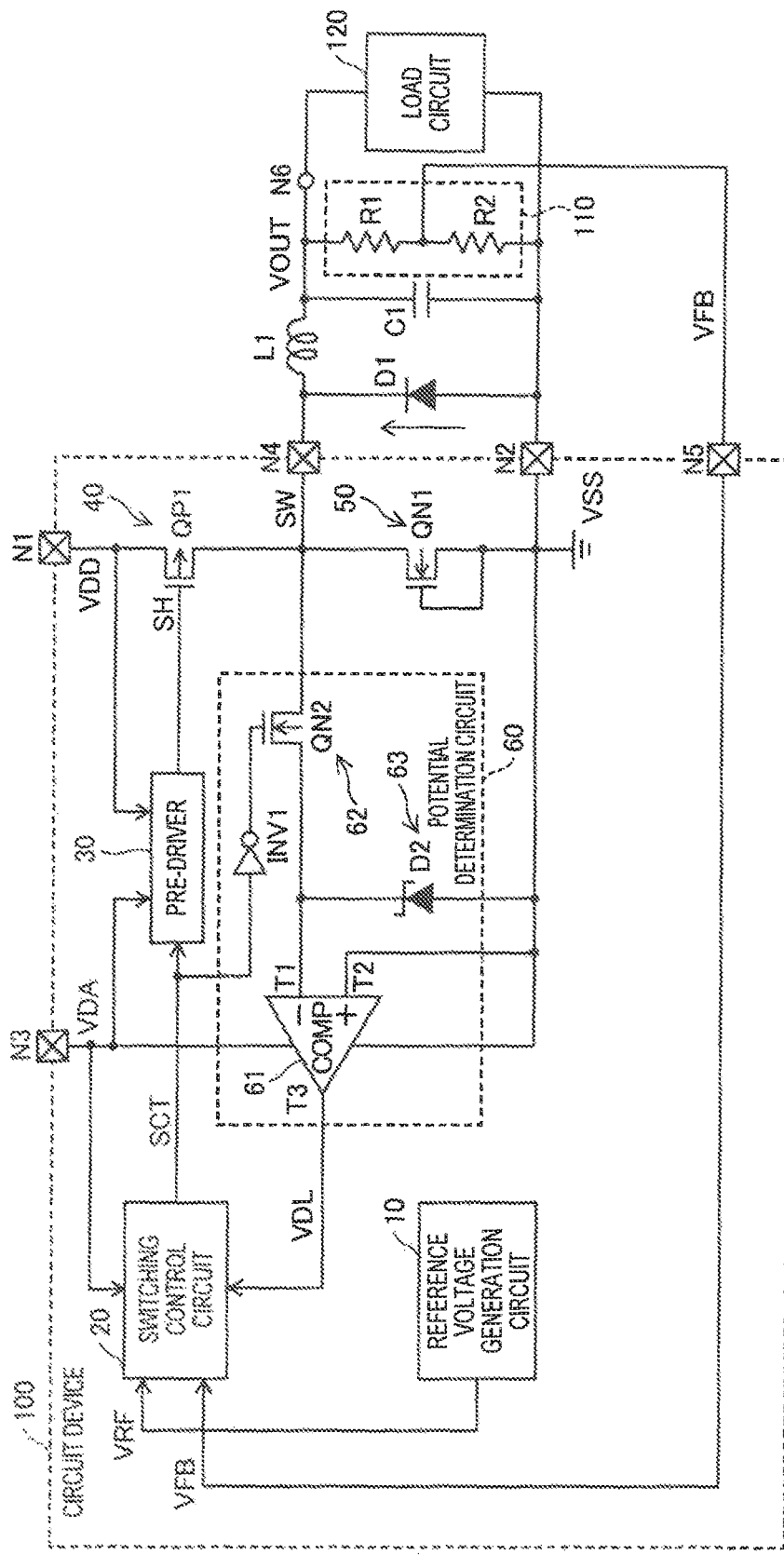
FIG. 1 is a circuit diagram illustrating a switching regulator according to one embodiment of the invention.

Hereinafter, an embodiment of the invention will be described in detail with reference to the drawings. Note that the same constituent elements are given the same reference numerals, and redundant description is omitted.

Configuration of Switching Regulator

FIG. 1 is a circuit diagram illustrating an exemplary configuration of a switching regulator according to one embodiment of the invention. The switching regulator includes a circuit device 100 according to one embodiment of the invention. As shown in FIG. 1, the circuit device 100 may include a reference voltage generation circuit 10, a switching control circuit 20, a pre-driver 30, an output circuit 40, a protection circuit 50, and a potential determination circuit 60.

At least some of the constituent elements shown in FIG. 1 may be incorporated in a semiconductor integrated circuit device (IC). The IC is constituted by an IC chip in which circuits are formed on a silicon substrate, for example, or is constituted by an IC chip being housed in a package. In this case, nodes N1 to N5 in the circuit device 100 correspond to pads (terminals) in the IC chip, or pins (terminals) provided in the package.

Also, the switching regulator may further include a Schottky barrier diode D1, an inductor L1, a capacitor C1, and a voltage divider circuit 110. At least some of the constituent elements may be not incorporated in the IC, and may be external components. Furthermore, for example, an IC such as an SOC (System on Chip), which is a load circuit 120 that receives a power supply from the switching regulator, is connected to the circuit device 100 via the inductor L1.

In the circuit device 100, a first power supply potential (power supply potential on a high potential side) VDD is supplied to the power supply node N1, a second power supply potential (power supply potential on a low potential side) VSS that is lower than the first power supply potential VDD is supplied to the power supply node N2, and an internal circuit power supply potential VDA that is lower than the first power supply potential VDD and is higher than the second power supply potential VSS is supplied to the power supply node N3. Hereinafter, a case where the power supply potential on the high potential side VDD is 42 V, the power supply potential on the low potential side VSS is 0 V (reference potential), and the internal circuit power supply potential VDA is 5 V will be described as an example.

The circuit device 100 generates an output signal SW by performing a switching operation, and supplies a drive current to the inductor L1 connected to the output node N4. Accordingly, the power supply potential on the high potential side VDD is stepped down, and an output power supply potential VOUT is generated at a connection node N6. The output power supply potential VOUT is supplied to the load circuit 120 connected between the connection node N6 and the power supply node N2.

The voltage divider circuit 110 includes resistance elements R1 and R2 that are connected in series between the connection node N6 and the power supply node N2, and generates a feedback voltage VFB by dividing an output voltage (VOUT-VSS) between the connection node N6 and the power supply node N2. The feedback voltage VFB is supplied to the circuit device 100 via the feedback node N5.

The reference voltage generation circuit 10 includes a bandgap reference circuit and the like, for example, and generates a reference voltage VRF. The switching control circuit 20 generates a control signal SCT whose pulse width is modulated by performing a PWM (Pulse Width Modulation) based on a difference between the reference voltage VRF and the feedback voltage VFB. The control signal SCT is supplied to the pre-driver 30.

The pre-driver 30 includes an inverter, a level shifter, and the like, for example, and generates a drive signal SH by inverting the control signal SCT and level-shifting the inverted result. Accordingly, in the case where the high level of the control signal SCT is the internal circuit power supply potential VDA (5 V), the high level of the drive signal SH that is generated by inverting and level-shifting the control signal SCT is the power supply potential on the high potential side VDD (42 V).

The output circuit 40 includes a P-channel MOS transistor QP1 serving as a switching element. In the case where the transistor QP1 is incorporated in the circuit device 100 such as an IC, the size of the switching regulator can be reduced, and the number of components can be reduced, and as a result, the manufacturing cost of the electronic apparatus can be reduced. The transistor QP1 is connected between the power supply node N1 and the output node N4, and upon entering a conduction state (on state) as per the drive signal SH, causes the potential of the output node N4 to approach the potential of the power supply node N1.

The transistor QP1 has a gate to which the drive signal SH is applied, a source connected to the power supply node N1, and a drain connected to the output node N4. The transistor QP1 enters an on state when the potential of the drive signal SH decreases below the power supply potential VDD by a threshold voltage of the transistor QP1 or more, and supplies a drive current to the inductor L1 via the output node N4.

The Schottky barrier diode D1 and the inductor L1 are connected to the output node N4. The Schottky barrier diode has characteristics in that a forward voltage is lower than that of a normal PN junction diode and the switching speed is high. The Schottky barrier diode D1 has a cathode connected to the output node N4 and an anode connected to the power supply node N2.

The inductor L1 includes one end connected to the output node N4 and the other end connected to the connection node N6, and is supplied with the drive current from the transistor QP1 in the output circuit 40. The capacitor C1 is connected between the other end (connection node N6) of the inductor L1 and the power supply node N2, and generates a smoothed output voltage (VOUT−VSS) by accumulating charges supplied from the inductor L1.

As a result of the transistor QP1 in the output circuit 40 performing a switching operation in this way, the circuit device 100 generates the output signal SW, and the drive current is supplied to the inductor L1 connected to the output node N4. Accordingly, the output power supply potential VOUT obtained by stepping down the power supply potential VDD is generated at the connection node N6 that is a connection point between the inductor L1 and the capacitor C1. The switching control circuit 20 controls the switching operation of the transistor QP1 in the output circuit 40 by generating the control signal SCT. The output power supply potential VOUT is controlled by the duty of the control signal SCT.

For example, when the control signal SCT is at a high level, the drive signal SH is at a low level, and the transistor QP1 is in an on state. In a period in which the transistor QP1 is in an on state, the potential of the output node N4 approaches the power supply potential VDD, a drive current flows from the transistor QP1 to the inductor L1, electric energy is converted to magnetic energy in the inductor L1, and the magnetic energy is accumulated in the inductor L1.

On the other hand, when the control signal SCT is at a low level, the drive signal SH is at a high level, and the transistor QP1 enters a non-conduction state (off state). In a period in which the transistor QP1 is in an off state, the magnetic energy accumulated in the inductor L1 is discharged as electric energy via the Schottky barrier diode D1, the load circuit 120, and the like. As a result, the potential of the output node N4 becomes a potential that is lower than the reference potential VSS (0 V) by a forward voltage (0.2 V to 0.4 V, for example) of the Schottky barrier diode D1.

However, in the case where a connection failure in connecting the Schottky barrier diode D1 (open state or incomplete connection) occurs in a step in which the Schottky barrier diode D1 is mounted on a wiring board or the like, a current path through which current accumulated in the inductor L1 that is connected in series to the output node N4 flows to the load circuit 120 no longer exists, and therefore, a large negative voltage is applied to the output node N4 due to the influence of counter-electromotive force generated in the inductor L1. As a result, there are cases in which the transistor QP1 in the output circuit 40 breaks down.

In order to avoid this situation, the protection circuit 50 is desirably provided. Note that the protection circuit 50 can act as an ESD (electrostatic discharge) protection circuit of the IC as well. The protection circuit 50 includes an N-channel LD (Lateral Double-diffused) MOS transistor QN1 that has a drain (or a source) connected to the output node N4 and a source (or a drain) and a gate that are connected to the power supply node N2, for example.

The transistor QN1 enters an on state when the potential of the output node N4 decreases below the reference potential VSS by a forward voltage of a parasitic diode (in which the drain terminal is a cathode, and the source terminal is an anode) of the transistor QN1 or more. Accordingly, even in a case where a connection failure in connecting the Schottky barrier diode D1 has occurred, the potential of the output node N4 does not decrease below a fixed value (−0.7 V, for example), and thus the breakdown of the transistor QP1 in the output circuit 40 can be prevented.

The LDMOS transistor has characteristics in that a breakdown voltage is high and the on resistance is low compared with a normal MOS transistor. When the transistor QP1 in the output circuit 40 is in an on state, the power supply potential VDD is applied to the protection circuit 50, and therefore, as a result of using such a high voltage transistor as the circuit element of the protection circuit 50, the protection circuit 50 is unlikely to break down. Alternatively, a diode having a cathode connected to the output node N4 and an anode connected to the power supply node N2 may be used as the circuit element of the protection circuit 50 in place of the transistor QN1.

However, with respect to a voltage drop at the output node N4 in a period in which the transistor QP1 in the output circuit 40 is in an off state, the voltage drop in the case where the Schottky barrier diode D1 is in a state of connection failure and a current flows through the parasitic diode in the protection circuit 50 is larger than the voltage drop in the case where the Schottky barrier diode D1 is connected normally and current flows through the Schottky barrier diode D1, and therefore, if the state in which the Schottky barrier diode D1 is in connection failure continues over a long period of time, it is possible that the transistor QP1 in the output circuit 40 or the transistor, the diode, or the like in the protection circuit 50 will break down or degrade.

Therefore, in the present embodiment, a potential determination circuit 60 that determines the potential of the output node N4 is provided, and the switching control circuit 20 controls the switching operation of the transistor QP1 in the output circuit 40 based on a determination result of the potential determination circuit 60.

Potential Determination Circuit

As shown in FIG. 1, the potential determination circuit 60 may include a comparator 61, a switch circuit 62, a clamp circuit 63, and an inverter INV1. The comparator 61 includes an input terminal T1 to which the potential of the output node N4 is applied via the switch circuit 62, and activates an output signal VDL to a high level when the potential of the output node N4 is lower than a determination level. On the other hand, when the potential of the output node N4 is higher than the determination level, the comparator 61 deactivates the output signal VDL to a low level.

Figure 2:
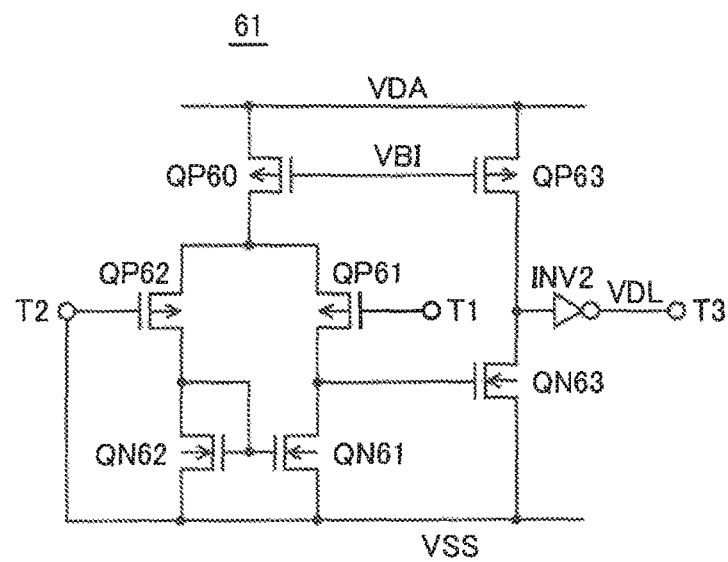
FIG. 2 is a circuit diagram illustrating an exemplary configuration of a comparator shown in FIG. 1.

FIG. 2 is a circuit diagram illustrating an exemplary configuration of the comparator shown in FIG. 1. As shown in FIG. 2, the comparator 61 includes P-channel MOS transistors QP60 to QP63, N-channel MOS transistors QN61 to QN63, and an inverter INV2, and includes an input terminal T1 to which the potential of the output node N4 is applied, an input terminal T2 to which the reference potential VSS is applied, and an output terminal T3 for outputting the output signal VDL.

The transistor QP60 has a source connected to an interconnect of the internal circuit power supply potential VDA and a gate to which a bias potential VBI is applied. The transistor QP61 has a source connected to a drain of the transistor QP60 and a gate connected to the input terminal T1 of the comparator 61. The transistor QP62 has a source connected to the drain of the transistor QP60 and a gate connected to the input terminal T2 of the comparator 61.

The transistor QN61 has a drain connected to a drain of the transistor QP61, a gate connected to a drain of the transistor QP62, and a source connected to an interconnect of the power supply potential VSS. The transistor QN62 has a drain and a gate that are connected to the drain of the transistor QP62 and a source connected to the interconnect of the power supply potential VSS.

The transistor QP63 has a source connected to the interconnect of the internal circuit power supply potential VDA and a gate to which the bias potential VBI is applied. The transistor QN63 has a drain connected to a drain of the transistor QP63, a gate that is connected to the drain of the transistor QP61 and the drain of the transistor QN61, and a source connected to the interconnect of the power supply potential VSS.

The inverter INV2 includes an input terminal that is connected to the drain of the transistor QP63 and the drain of the transistor QN63, and an output terminal connected to the output terminal T3 of the comparator 61. The inverter INV2 inverts the level of a signal that is applied to the input terminal, and outputs the inverted signal from the output terminal as the output signal VDL.

In the comparator 61, an offset voltage that is smaller than the forward voltage of the parasitic diode (in which the drain terminal is a cathode, and the source terminal is an anode) of the transistor QN1 in the protection circuit 50, for example, is set between the input terminal T1 and the input terminal T2 by changing the ratio W/L of a channel width W to a channel length L between the transistor QP61 and the transistor QP62 that constitute a differential pair. Accordingly, a desired determination level can be set by using the offset voltage of the comparator 61.

For example, as a result of setting the channel width W of the transistor QP62 to be larger than the channel width W of the transistor QP61, the comparator 61 compares the potential of the output node N4 with a determination level that is lower than the reference potential VSS by the offset voltage. In the case where the forward voltage of the Schottky barrier diode D1 shown in FIG. 1 is 0.3 V, and the forward voltage of the parasitic diode (in which the drain terminal is a cathode, and the source terminal is an anode) of the transistor QN1 in the protection circuit 50 is 0.7 V, the determination level is set to a potential that is lower than −0.3 V and is higher than −0.7 V.

This determination level needs to be adjusted in accordance with process fluctuation or the like of the IC. Note that although the offset voltage of the comparator 61 may be set by changing the threshold voltage of the transistor QP61 from the threshold voltage of the transistor QP62, the influence of process fluctuation is smaller in the case where the offset voltage is set by changing the ratio W/L of the channel width W to the channel length L.

Again referring to FIG. 1, in the potential determination circuit 60, the switch circuit 62 is connected between the output node N4 and the input terminal T1 of the comparator 61, is in an off state when the transistor QP1 in the output circuit 40 is in an on state, and is in an on state when the transistor QP1 in the output circuit 40 is in an off state. Accordingly, in a period during which the transistor QP1 in the output circuit 40 supplies the power supply potential VDD to the output node N4, the power supply potential VDD is not applied to the input terminal T1 of the comparator 61, and thus breakdown of the comparator 61 can be prevented.

The switch circuit 62 includes an N-channel MOS transistor QN2 that has one end (drain) connected to the output node N4, the other end (source) connected to the input terminal T1 of the comparator 61, and a gate connected to an output terminal of the inverter INV1. The inverter INV1 inverts the control signal SCT applied to the input terminal and outputs the inverted control signal SCT from the output terminal. The transistor QN2 is in an off state when the control signal SOT is at a high level, and is in an on state when the control signal SCT is at a low level.

The transistor QN2 is desirably a high voltage transistor such as an LDMOS transistor. Specifically, the transistor QN2 has a higher breakdown voltage than the transistors that constitute the comparator 61, and the transistor QN2, the transistor QP1, and the transistor QN1 are transistors having a similar breakdown voltage. When the transistor QP1 in the output circuit 40 is in an on state, the power supply potential VDD is applied to the switch circuit 62, and therefore, as a result of using such a high voltage transistor, the switch circuit 62 is unlikely to break down.

Also, the clamp circuit 63 has one end connected to the input terminal T1 of the comparator 61 and the other end connected to the power supply node N2, and clamps the potential of the input terminal T1 of the comparator 61 when the potential of the input terminal T1 of the comparator 61 becomes a value that is higher than the reference potential VSS by a predetermined value or more.

Accordingly, an over voltage is prevented from being applied to the comparator 61 due to the influence of a parasitic capacitance component of the switch circuit 62 or the influence of timing shift between the timing at which the transistor QP1 in the output circuit 40 transitions to an on state or an off state and the timing at which the switch circuit 62 transitions to an off state or an on state, and thus the breakdown of the comparator 61 can be prevented.

The clamp circuit 63 includes a zener diode D2 having a cathode connected to the input terminal T1 of the comparator 61 and an anode connected to the power supply node N2, for example. The zener diode D2 breaks down when the potential of the input terminal T1 of the comparator 61 becomes a value that is higher than the reference potential VSS by a breakdown voltage or more, and thus clamps the potential of the input terminal T1 of the comparator 61. The breakdown voltage of the zener diode D2 is set to a voltage (approximately 3 V to 5V, for example) that is less than or equal to a rated voltage that can be applied to the input terminal T1 of the comparator 61.

Switching Control Circuit

The switching control circuit 20 controls the level of the drive signal SH such that the transistor QP1 will not enter an on state again, based on a period during which or the number of times the output signal VDL of the comparator 61 is activated after the transistor QP1 in the output circuit 40 has transitioned from an on state to an off state.

For example, the switching control circuit 20 controls the level of the drive signal SH such that the transistor QP1 will not enter an on state again in the case where the number of times the output signal VDL of the comparator 61 is continuously activated during a second period or more after a first period has elapsed from when the transistor QP1 transitioned from an on state to an off state, has reached a predetermined number of times.

In such a case, the switching control circuit 20 keeps the control signal SOT at a low level. Accordingly, the pre-driver 30 keeps the drive signal SH at a high level, and therefore, the transistor QP1 is kept in an off state. Here, the predetermined number of times is desirably two or more. Accordingly, the influence of noise or the like is removed, and thus whether or not a connection failure in connecting the Schottky barrier diode D1 has occurred can be appropriately determined.

Figure 3:
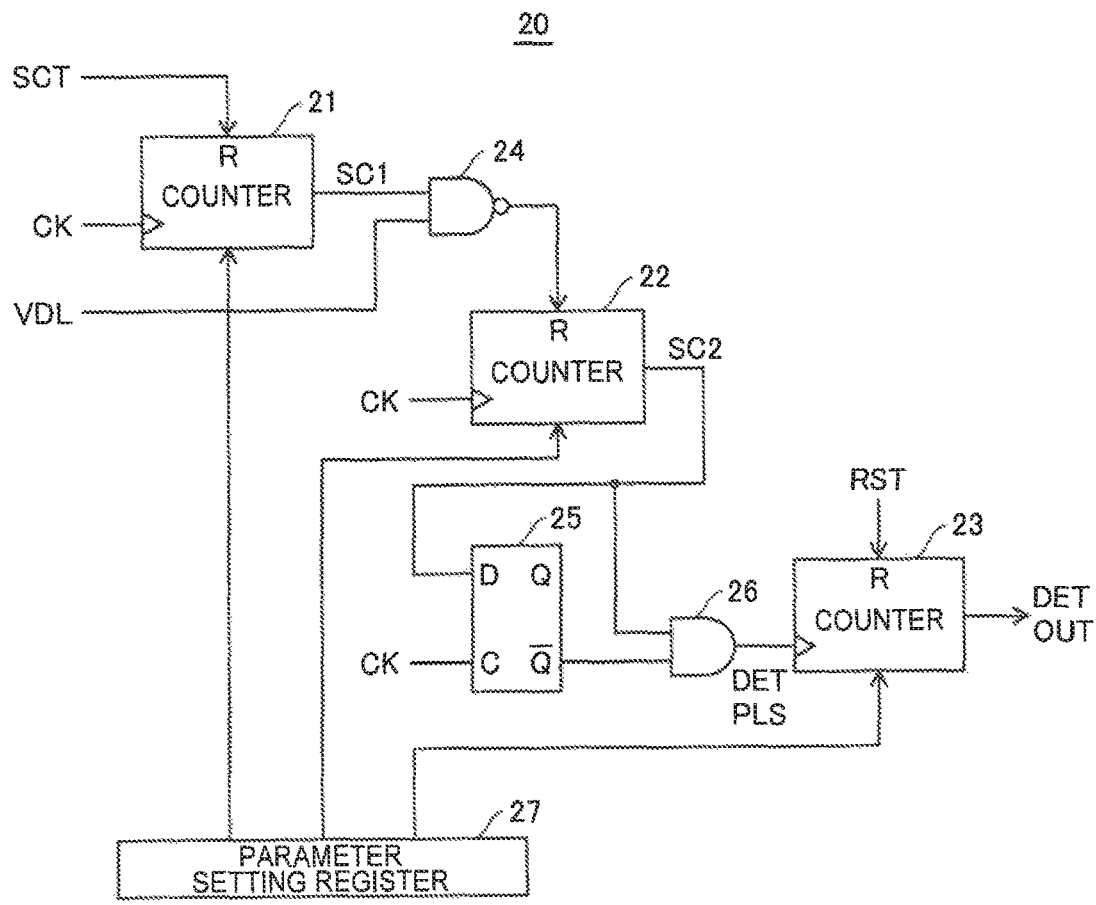
FIG. 3 is a block diagram illustrating an exemplary configuration of a portion of the switching control circuit shown in FIG. 1.

FIG. 3 is a block diagram illustrating an exemplary configuration of a portion of the switching control circuit shown in FIG. 1. As shown in FIG. 3, the switching control circuit 20 includes counters 21 to 23, a NAND circuit 24, a D-type flip-flop 25, an AND circuit 26, and a parameter setting register 27.

The control signal SCT is supplied to a reset terminal R of the counter 21, and the counter 21 is reset by the control signal SCT. In a period during which the control signal SCT is at a high level, the transistor QP1 in the output circuit 40 is in an on state, and the counter 21 is in a reset state. When the control signal SOT is at a low level, the transistor QP1 in the output circuit 40 transitions from an on state to an off state, and the reset of the counter 21 is cancelled.

The counter 21 increments a first count value by performing a count operation in synchronization with a clock signal CK having a higher frequency than the frequency of the control signal SCT. The clock signal CK may be generated in the circuit device 100, or may be supplied from an external circuit. When the first count value reaches a first value that defines the first period, the counter 21 activates the output signal SC1 to a high level.

The NAND circuit 24 obtains a logical product of an output signal SC1 of the counter 21 and the output signal VDL of the comparator 61, inverts a signal that represents the logical product, and outputs the inverted signal. When the output signal SC1 of the counter 21 is at a low level or the output signal VDL of the comparator 61 is at low level, the output signal of the NAND circuit 24 is at a high level, and therefore, the counter 22 is in a reset state.

When the output signal SC1 of the counter 21 is activated to a high level, and the output signal VDL of the comparator 61 is activated to a high level as well, the counter 22 increments a second count value by performing a count operation in synchronization with the clock signal CK. When the second count value reaches a second value that defines a second period, the counter 22 activates an output signal SC2 to a high level.

Here, if the control signal SCT is at a high level or the output signal VDL of the comparator 61 is at a low level before the second count value reaches the second value, the counter 22 is reset. Therefore, the first period and the second period need to be set such that the sum thereof does not exceed the period during which the control signal SCT is at a low level.

The D-type flip-flop 25 latches the output signal SC2 of the counter 22 in synchronization with the clock signal CK. The AND circuit 26 obtains a logical product of the output signal SC2 of the counter 22 and an inverted output signal Q bar of the D-type flip-flop 25. When the output signal SC2 of the counter 22 is activated to a high level, the AND circuit 26 outputs a detection pulse DETPLS that is at a high level within a period of one cycle of the clock signal CK.

The counter 23 counts the detection pulses DETPLS output from the AND circuit 26, and activates a detection signal DETOUT to a high level when the counted number reaches a predetermined number. Note that, in the case where the counted number does not reach the predetermined number in a period from when the control signal SCT transitions to a low level until when the control signal SOT transitions to a high level, the counter 23 is reset.

In this way, the detection signal DETOUT is activated in the case where the number of times the output signal VDL of the comparator 61 is continuously activated during the second period or more after the first period has elapsed from when the transistor QP1 in the output circuit 40 transitioned from an on state to an off state, reaches the predetermined number of times. Note that the counter 23 is reset in accordance with a reset signal RST when the power supply is turned on or when a forced reset operation is performed.

The parameter setting register 27 stores pieces of data that represent the first value that defines the first period, the second value that defines the second period, and the predetermined number of times that are used in the counters 21 to 23. By changing the pieces of data to be stored in the parameter setting register 27, the timing, the period, and the like for when the determination result of the potential determination circuit 60 is acquired can be adjusted.

Exemplary Operation

Figure 4:
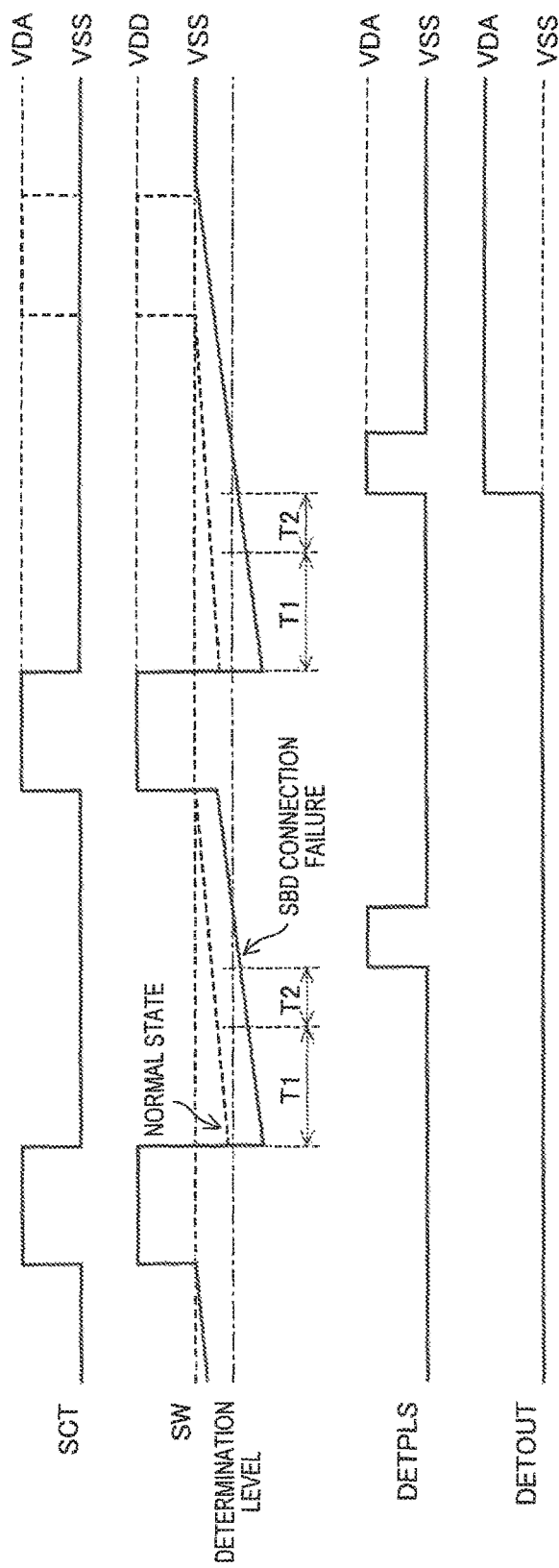
FIG. 4 is a waveform diagram illustrating waveforms at nodes in the switching regulator shown in FIG. 1.

Next, an exemplary operation of the switching regulator shown in FIG. 1 will be described in detail with reference to FIGS. 1 and 4, FIG. 4 is a waveform diagram illustrating waveforms at nodes in the switching regulator shown in FIG. 1.

In a period in which the control signal SCT is at a high level, the drive signal SH is at a low level, and the transistor QP1 in the output circuit 40 is in an on state. Accordingly, the potential of the output signal SW rises to the vicinity of the power supply potential VDD. When the control signal SCT is at a low level, the drive signal SH is at a high level, and therefore, the transistor QP1 is turned off.

In a normal state, a current flows through the Schottky barrier diode D1, the inductor L1, and the load circuit 120, and therefore, the potential of the output signal SW decreases to approximately −0.3 V, as shown by a broken line, for example. Thereafter, the current flowing through the Schottky barrier diode D1 gradually decreases as time passes, and the potential of the output signal SW gradually rises toward the reference potential VSS.

On the other hand, in the case where a connection failure in connecting the Schottky barrier diode D1 (open state or incomplete connection) occurs, if the protection circuit 50 is not provided, a current path through which the current accumulated in the inductor L1, which is connected in series to the output node N4, flows to the load circuit 120 no longer exists, and therefore, a large negative voltage is applied to the output node N4 due to the influence of a counter-electromotive force generated in the inductor L1, and it is possible that the transistor QP1 in the output circuit 40 will break down.

If the protection circuit 50 is provided, a current flows through the transistor QN1 of the protection circuit 50, the inductor L1, and the load circuit 120, as shown by a solid line, and thus the potential of the output signal SW decreases to approximately −0.7 V, for example. Thereafter, the current flowing through the transistor QN1 gradually decreases as time passes, and the potential of the output signal SW gradually rises toward the reference potential VSS.

In this case, the forward voltage of the parasitic diode (in which the drain terminal is a cathode, and the source terminal is an anode) of the transistor QN1 is larger than the forward voltage of the Schottky barrier diode D1, and therefore, the potential of the output signal SW decreases below that in a normal state. If such a state continues over a long period of time, it is possible that the transistor QP1 in the output circuit 40 or the transistor QN1 of the protection circuit 50 will break down or degrade due to degradation over time.

Therefore, the comparator 61 compares the potential of the output signal SW and a determination level (approximately −0.4 V, for example), and activates the output signal VDL when the potential of the output signal SW is lower than the determination level. In order to avoid the influence of noise such as switching noise, the switching control circuit 20 generates the detection pulse DETPLS in the case where the output signal of the comparator 61 is continuously activated during the second period T2 or more after the first period T1 has elapsed from when the transistor QP1 transitioned from an on state to an off state.

Also, the switching control circuit 20 activates the detection signal DETOUT to a high level in the case where the number of times the detection pulse DETPLS is generated reaches a predetermined number of times (two times in the example shown in FIG. 4). In the case where the predetermined number of times is a plurality of times, the switching control circuit 20 recognizes that the determination result is correct if the determination result is the same for each of the plurality of times of determinations, even if an error in determination due to the influence of noise or the like is included, and causes the circuit device to enter an operation stop mode in which the switching operation is stopped. Therefore, the possibility of the switching operation being stopped by one instance of an error in determination is eliminated.

The switching control circuit 20 keeps the control signal SCT at a low level when the detection signal DETOUT is activated to a high level. Accordingly, the pre-driver 30 keeps the drive signal SH at a high level, and therefore, the transistor QP1 continues to be in an off state, and will not enter an on state again.

According to the present embodiment, the comparator 61 that activates the output signal VDL when the potential of the output node N4 is lower than the determination level and the switching control circuit 20 that performs control such that the transistor QP1 in the output circuit 40 will not enter an on state again based on the output signal VDL of the comparator 61 are provided, a connection failure in connecting the Schottky barrier diode D1 between the output node N4 and the power supply node N2 can be detected at a desired determination level, and the switching operation can be stopped when a connection failure in connecting the Schottky barrier diode D1 has occurred. As a result, the breakdown or degradation of the transistor QP1 in the output circuit 40 or the transistor QN1 of the protection circuit 50 can be prevented.

Furthermore, according to the present embodiment, a switching regulator can be provided in which breakdown or degradation thereof is unlikely to occur even if a mounting failure in mounting the Schottky barrier diode D1 occurs, using the circuit device 100 that stops the switching operation when a connection failure in connecting the Schottky barrier diode D1 has occurred.

Electronic Apparatus

Next, an electronic apparatus using the switching regulator according to one embodiment of the invention will be described. Hereinafter, a case where the electronic apparatus is a printer will be described as an example.

Figure 5:
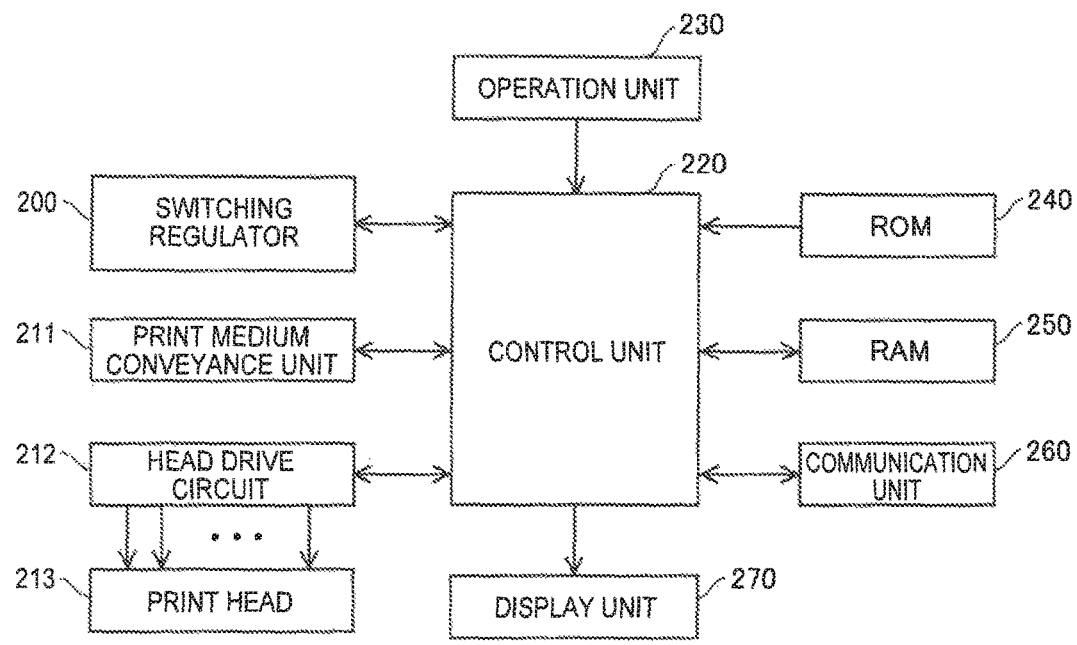
FIG. 5 is a block diagram illustrating an exemplary configuration of an electronic apparatus according to one embodiment of the invention.

FIG. 5 is a block diagram illustrating an exemplary configuration of the electronic apparatus according to one embodiment of the invention. As shown in FIG. 5, the electronic apparatus includes a switching regulator 200 according to one embodiment of the invention, a print medium conveyance unit 211, a head drive circuit 212, a print head 213, a control unit 220, an operation unit 230, a ROM (read only memory) 240, a RAM (random access memory) 250, a communication unit 260, and a display unit 270. Note that some of the constituent elements shown in FIG. 5 may be omitted or changed, or another constituent element may be added to the constituent elements shown in FIG. 5.

In the print medium conveyance unit 211, for example, a stepping motor drives a platen roller via a belt, and thus a sheet, which is a print medium, is conveyed. The head drive circuit 212 drives the print head 213, and thus the print head 213 performs printing on the sheet that has been conveyed by the print medium conveyance unit 211.

The control unit 220 includes a CPU (central processing device) and the like, for example, and performs various types of control processing in accordance with programs that are stored in the ROM 240 and the like. For example, the control unit 220 controls the print medium conveyance unit 211 and the head drive circuit 212 according to an operation signal supplied from the operation unit 230, controls the communication unit 260 in order to perform data communication with an external device, and generates a display signal for displaying various types of information in the display unit 270.

The operation unit 230 is an input device including operation keys, button switches or the like, and outputs operation signals according to operations performed by a user to the control unit 220, for example. The ROM 240 stores programs, data, and the like for the control unit 220 to perform various types of control processing. Also, the RAM 250 is used as a work area of the control unit 220, and temporarily stores programs and data read out from the ROM 240, and data and the like input using the operation unit 230.

The communication unit 260 is, for example, constituted by an analog circuit and a digital circuit, and performs data communication between the control unit 220 and an external device. Accordingly, the printer shown in FIG. 5 can perform a print operation based on print data supplied from an external host computer or the like. The display unit 270, for example, includes an LCD (liquid crystal display) or the like, and displays various types of information based on the display signal supplied from the control unit 220.

The switching regulator 200 steps down the power supply potential VDD (42 V) that is supplied by a power supply circuit or the like to generate the output power supply potential VOUT by performing a switching operation. The control unit 220 and the like operates with the output power supply potential VOUT being supplied from the switching regulator 200.

The electronic apparatus corresponds, in addition to the printer, a mobile terminal such as a mobile phone, a smart card, a calculator, an electronic dictionary, an electronic game machine, a digital still camera, a digital video camera, a television, a TV phone, a security television monitor, a head-mounted display, a personal computer, a network apparatus, a car navigation device, a robot, a measurement device, a medical apparatus (e.g., electronic thermometer, sphygmomanometer, blood glucose meter, electrocardiograph device, ultrasonic diagnostic apparatus, and electronic endoscope), or the like, for example.

According to the present embodiment, a highly reliable electronic apparatus can be provided using the switching regulator 200 that is unlikely to break down or degrade even if a mounting failure in mounting the Schottky barrier diode occurs. Note that the invention is not limited to the embodiment described above, and many modifications can be made within the technical idea of the invention by a person having ordinary skill in the art.

This application claims priority from Japanese Patent Application No. 2016-067505 filed in the Japanese Patent Office on Mar. 30, 2016, the entire disclosure of which is hereby incorporated by reference in its entirely.

What is claimed is:

1. A circuit device comprising:
   a comparator that includes an input terminal and an output terminal, and outputs from the output terminal an output signal that is activated when a potential of the input terminal is lower than a determination level;
   a switch circuit that is electrically connected between the input terminal of the comparator and an output node connected to a switching element that enters a conduction state or a non-conduction state according to a drive signal, and is in a non-conduction state when the switching element is in the conduction state; and
   a control circuit that controls a level of the drive signal such that the switching element will not enter the conduction state again when a condition is met by a state of the output signal of the comparator after the switching element has transitioned from the conduction state to the non-conduction state.

2. The circuit device according to claim 1, wherein the switch circuit includes a high voltage transistor.

3. The circuit device according to claim 1, further comprising
   a clamp circuit that has one end connected to the input terminal of the comparator and another end connected to a power supply node on a low potential side, and clamps the potential of the input terminal of the comparator when the potential of the input terminal of the comparator becomes higher than the power supply potential on the low potential side by at least a predetermined value.

4. The circuit device according to claim 1, further comprising a protection circuit that has one end connected to the output node and another end connected to a power supply node on a low potential side, includes a transistor, and enters a conduction state when a potential of the output node becomes lower than a power supply potential on the low potential side by at least a forward voltage of a parasitic diode of the transistor.

5. The circuit device according to claim 4, wherein the transistor of the protection circuit includes a high voltage transistor.

6. The circuit device according to claim 4, wherein the comparator further includes a second input terminal to which the power supply potential on the low potential side is applied, wherein an offset voltage is set between the input terminal and the second input terminal, the offset voltage being smaller than the forward voltage of the parasitic diode of the transistor, and the comparator compares the potential of the output node with a determination level that is lower than the power supply potential on the low potential side by the offset voltage.

7. The circuit device according to claim 1, wherein the control circuit controls the level of the drive signal such that the switching element will not enter the conduction state again in a case where a number of times the output signal of the comparator is continuously activated during a second period after a first period has elapsed from when the switching element transitioned from the conduction state to the non-conduction state, reaches a predetermined number of times, which is two or more times.

8. The circuit device according to claim 1, further comprising the switching element that is connected between a power supply node on a high potential side and the output node, and, upon entering the conduction state according to the drive signal, supplies a power supply potential on the high potential side to the output node.

9. A switching regulator comprising:
the circuit device according to claim 1;
a Schottky barrier diode that has a cathode connected to the output node and an anode connected to a power supply node on a low potential side;
an inductor that has one end connected to the output node, and is supplied with a drive current from the switching element; and
a capacitor that is connected between another end of the inductor and the power supply node on the low potential side, and accumulates a charge supplied from the inductor.

10. An electronic apparatus comprising the switching regulator according to claim 9.

11. The circuit device according to claim 1, wherein the state of the output signal includes at least one of a length of a period during which the output signal of the comparator is activated and a number of times the output signal of the comparator is activated after the switching element has transitioned from the conduction state to the non-conduction state.

* * * * *